G. D. CHISHOLM.
Device for Preventing Horses from Jumping, &c.
No. 168,082.　　　　　　　　　　　Patented Sept. 28, 1875.
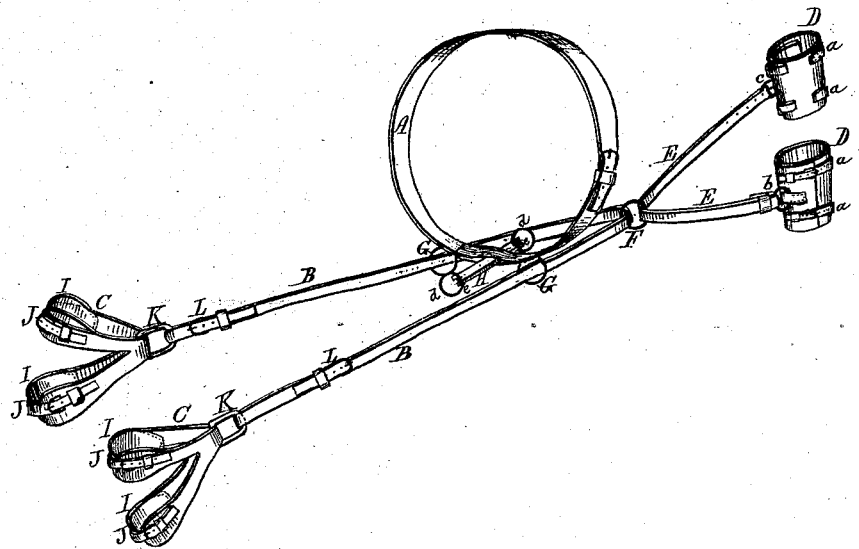
Witnesses
P. L. Scriven
W. B. Bruce
Inventor
George D. Chisholm
By Wm Bruce
Atty

UNITED STATES PATENT OFFICE.

GEORGE D. CHISHOLM, OF EAST FLAMBOROUGH, CANADA, ASSIGNOR OF ONE-HALF HIS RIGHT TO SUMMERFIELD DOUGLASS, OF SAME PLACE.

IMPROVEMENT IN DEVICES FOR PREVENTING HORSES FROM JUMPING, &c.

Specification forming part of Letters Patent No. 168,082, dated September 28, 1875; application filed December 12, 1874.

*To all whom it may concern:*

Be it known that I, GEORGE DUDLEY CHISHOLM, of East Flamborough, in the county of Wentworth, in the Province of Ontario, Dominion of Canada, have invented a certain new and useful Device for Preventing Horses from Jumping, Kicking, or Running Away; and I do hereby declare that the following is a full, clear, and exact description of the same.

The device is particularly adapted for horses when turned loose in pasture, and is attached to them to prevent their jumping fences. It also can be attached to horses to prevent their kicking and running away. The device can be used on a horse in or out of the harness. It consists in a leather girt strapped around a horse's body, in the place where girts are usually placed, to the under side of which are fastened two small iron rings. A strap is made to pass through these rings, and also another and more forward ring. To the rear ends of said strap are secured hock-straps, for passing around the horse's hind legs at the hock. To the forward portion of the strap, and attached to it by the same ring, is an adjustable strap, to the ends of which are secured leggings, which are made to encircle the horse's fore legs above the knee. By these arrangements of straps, leggings, and hock-straps a horse can walk and trot without his movements becoming impeded; but he cannot jump. The moment he attempts it the forward strap and leggings draw downward, so that he cannot raise his fore feet high enough to jump. At the same time the straps are so correctly adjusted that he cannot get his feet entangled, even when rolling on the ground. In driving a horse with my device attached to him he can easily and freely trot and walk, the straps and rings allowing him to do so; but he cannot run off on a gallop.

By reference to the annexed drawings it will be seen that A represents a girt, which is buckled around a horse's body, in the usual place. To the lower side of the girt are secured two iron rings, G G. Through the said rings the strap B is made to slide and operate. It also passes through a ring, F, near the forward part of the device. Attached to the rear ends of the strap B, by means of D-rings K, are split hock-straps C C, provided with proper friction-pads I I. The ends of said hock-straps are fitted to a horse's legs by means of the adjusting-straps and buckles J J J J. The length of the strap B can also be adjusted to fit a horse by means of the buckles L L. By reference to the ring F it will be seen that a strap, E, passes through the said ring, to one end of which is secured the right legging D by means of a ring, $b$, and the left legging D by means of a buckle, $c$, which also adjusts the length of the said strap E. The said leggings are made a little larger at the top than the bottom, so as to fit a horse's legs. They are made to clasp the horse's fore legs just above the knee, and are fastened securely by means of the small straps and buckles $a\ a\ a\ a$, as shown. The straps E and B slide through the rings G G and F, respectively, and adapt themselves to the movements of a horse when walking or trotting, as one leg only can move forward at once—that is, a fore leg and a hind leg can move forward at the same time, as in walking; but the two fore legs cannot move forward at the same time, which prevents the act of jumping, and for the same reason a horse cannot kick with his hind legs.

In the drawing the device is represented as it is placed on a breachy horse when in pasture, to prevent him from jumping fences. A slight change in the arrangement of the straps is made when a horse is placed in harness and driven. It is as follows: By reference to the drawing it will be seen that there is a short thick strap, H, made to slide through a loop in the girt A. It has an iron ring, $d$, at each end, which are secured in place by pins $e\ e$ at or near each end of the strap, to prevent the rings from pulling out. The strap B is removed from the rings G G and F and passed through the rear ring of the strap H, and the front strap E is removed from the ring F and passed through the forward ring of the strap H. This plan is very convenient in driving a fractious or kicking horse, as it is impossible for a horse with this device attached to kick or run away.

It will be seen that all the buckles are placed on the outside of the leggings and straps, so as to prevent any injury to the animal.

The advantages of my device are, first, a horse can walk, trot, and move around without his being hampered or injured, and his head and neck are left entirely free. Second, when the straps are properly adjusted it will be impossible for a horse to jump any higher than he can step.

What I claim as my invention is—

The combination of the girt A, having the rings G G, the longitudinal straps B B, passing through the rings G G, and having at their ends the rings K K, and bifurcated or split straps C C and the strap E, connected with the straps B B, and provided at its ends with the tapering elongated leggings D, the whole being constructed and arranged substantially as and for the purpose described.

Dated at Hamilton, Canada, this 26th day of November, 1874.

GEORGE DUDLEY CHISHOLM.

Signed in the presence of—
WM. BRUCE,
P. L. SCRIVEN.